United States Patent
Vicente, Jr. et al.

(10) Patent No.: US 8,817,338 B2
(45) Date of Patent: Aug. 26, 2014

(54) SCAN MECHANISM AND SCAN MODULE

(71) Applicants: Domingo Abao Vicente, Jr., Singapore (SG); Chia-Hung Kao, New Taipei (TW)

(72) Inventors: Domingo Abao Vicente, Jr., Singapore (SG); Chia-Hung Kao, New Taipei (TW)

(73) Assignees: Cal-Comp Precision (Singapore) Limited, Singapore (SG); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 13/726,647

(22) Filed: Dec. 26, 2012

(65) Prior Publication Data

US 2014/0139894 A1 May 22, 2014

(30) Foreign Application Priority Data

Nov. 22, 2012 (SG) .................................. 201208603

(51) Int. Cl.
*H04N 1/04* (2006.01)
*H04N 1/00* (2006.01)

(52) U.S. Cl.
CPC ................................. *H04N 1/00538* (2013.01)
USPC ............. 358/474; 358/496; 399/367; 271/118

(58) Field of Classification Search
CPC ............ H04N 2201/0442; H04N 2201/04755; H04N 2201/0464; H04N 1/128; H04N 1/1013; G03G 5/00
USPC .......... 358/497, 496, 486, 474, 494; 399/367, 399/211, 379, 118; 271/109
See application file for complete search history.

(56) References Cited

U.S. PATENT DOCUMENTS

| | | | |
|---|---|---|---|
| 4,270,404 A | | 6/1981 | Murakoshi et al. |
| 5,754,315 A | * | 5/1998 | Tazawa et al. ................ 358/498 |
| 5,902,994 A | * | 5/1999 | Lisson et al. ................ 250/208.1 |
| 5,926,289 A | * | 7/1999 | Brandestini et al. .......... 358/487 |
| 6,366,343 B1 | * | 4/2002 | Lee ................................. 355/84 |
| 6,717,703 B2 | * | 4/2004 | Lan ................................ 358/497 |
| 6,879,415 B2 | * | 4/2005 | Kurosawa ...................... 358/474 |
| 6,952,292 B2 | * | 10/2005 | Takeuchi et al. .............. 358/497 |
| 7,031,032 B2 | * | 4/2006 | Westcott et al. .............. 358/474 |
| 7,672,027 B2 | * | 3/2010 | Nakayama et al. .......... 358/498 |
| 7,898,701 B2 | * | 3/2011 | Oguchi ......................... 358/474 |
| 7,948,663 B2 | * | 5/2011 | Doan et al. .................... 358/474 |
| 7,973,982 B2 | * | 7/2011 | Mercer ......................... 358/474 |
| 8,081,356 B2 | * | 12/2011 | Yamauchi ..................... 358/497 |

(Continued)

OTHER PUBLICATIONS

"Office Action of Singapore Counterpart Application", issued on May 2, 2014, p. 1-p. 14.

*Primary Examiner* — Negussie Worku
(74) *Attorney, Agent, or Firm* — Jianq Chyun IP Office

(57) ABSTRACT

A scan mechanism and a scan module are provided. The scan mechanism adapted to be used in a scan module includes a rack and a scan unit. The rack has an engaging surface, a bottom surface and a plurality of teeth disposed on the engaging surface. Each of the teeth comprises a top end, wherein the distance between the centers of any two adjacent top ends is W, the shortest distance from the top end of each tooth to the bottom surface of the rack is D, and W/D is from 0.56 to 0.79. The scan unit includes a gear engaged with the teeth of the rack and adapted to roll along the engaging surface of the rack, wherein the scan unit is slidably disposed on the rack through the gear.

17 Claims, 8 Drawing Sheets

(56) References Cited

U.S. PATENT DOCUMENTS

| | | | |
|---|---|---|---|
| 8,259,366 B2 * | 9/2012 | Hayakawa et al. | 358/497 |
| 8,289,366 B2 * | 10/2012 | Greenwood et al. | 348/14.08 |
| 8,493,638 B2 * | 7/2013 | Lee | 358/497 |
| 8,508,815 B2 * | 8/2013 | Kim | 358/497 |
| 8,547,608 B2 * | 10/2013 | Murray | 358/497 |
| 8,564,851 B2 * | 10/2013 | Beselt | 358/474 |
| 8,570,612 B2 * | 10/2013 | Lee | 358/474 |
| 8,587,841 B2 * | 11/2013 | Murray | 358/474 |
| 2002/0117546 A1 | 8/2002 | Huang | |
| 2004/0012823 A1 | 1/2004 | Hendrix et al. | |
| 2008/0223163 A1 | 9/2008 | Yamazaki et al. | |

* cited by examiner

SCAN MECHANISM AND SCAN MODULE

CROSS-REFERENCE TO RELATED APPLICATION

This application claims the priority benefit of Singapore application serial no. 201208603-9, filed on Nov. 22, 2012. The entirety of the above-mentioned patent application is hereby incorporated by reference herein and made a part of this specification.

BACKGROUND OF THE INVENTION

1. Field of the Invention

The present invention generally relates to a scan mechanism and a scan module. More particularly, the present invention relates to a scan mechanism and a scan module using the same.

2. Description of Related Art

Along with the progress of hardware and software, a scanner has become one of the basic equipments for a computer user, by which test data or image data such as file, magazine, book and picture can be scanned for further processing.

Among various scanners, a flatbed scanner is the most often one. A scan module is used for capturing an image of an object to be scanned. The scan module generally includes an optical sensor and a transmission mechanism. To scan a file, a transmission mechanism including a motor, a set of gears disposed on a scan unit and a transmission belt is required to drive the above-mentioned scan unit, so that the scan unit slips along a guiding rack to accomplish scanning job on an object horizontally placed over the scan unit.

In the mechanism however, if the above-mentioned set of gears can not be smoothly moved along the guiding rack, the scan unit is unable to move smoothly in parallel along the guiding rack, so as to make the quality of the scanned image unstable. Therefore, the interface of the set of gears and the guiding rack has the direct impact on the scanning quality.

In addition, every time a scan is completed, the scan module must return to a home position. In a conventional detecting home position method, the scan module is installed a protection wall and a home sensor in a direction moving towards the home position. When the scanning task is done, the transmission mechanism causes the scan module to move, and when reaching the home position, the home sensor provides a detecting signal so the transmission mechanism stops operating. The scan module stops at the home position, and waits for the next scanning task to start. However, installing additional components in the scanner increases assembly time and production cost.

How to resolve the above mentioned problems of conventional scan modules, simplify the amount and types of components, and achieve a low cost high scan quality scanner is a task looking to be overcome.

SUMMARY OF THE INVENTION

Accordingly, the present invention is directed to a scan mechanism which reduces the production cost and improves the scan quality.

The present invention is directed to a scan module, wherein the scan mechanism thereof can reduce the production cost and improve the scan quality.

The present invention provides a scan mechanism adapted to be used in a scan module. The scan mechanism includes a rack and a scan unit. The rack has an engaging surface, a bottom surface and a plurality of teeth disposed on the engaging surface. Each of the teeth comprises a top end and a bottom end, wherein the distance between the centers of any two adjacent top ends is W, the shortest distance from the top end of each tooth to the bottom surface of the rack is D, and W/D is from 0.56 to 0.79. The scan unit includes a gear engaged with the teeth of the rack and adapted to roll along the engaging surface of the rack, wherein the scan unit is slidably disposed on the rack through the gear.

The present invention further provides a scan module comprising a body and a scan mechanism. The body has a carrying surface for a paper to be disposed thereon. The scan mechanism is disposed in the body and under the carrying surface. The scan mechanism comprises a rack and a scan unit. The rack has an engaging surface, a bottom surface and a plurality of teeth disposed on the engaging surface. Each of the teeth comprises a top end and a bottom end, wherein the distance between the centers of any two adjacent top ends is W, the shortest distance from the top end of each tooth to the bottom surface of the rack is D, and W/D is from 0.56 to 0.79. The scan unit comprises a gear engaged with the teeth of the rack and adapted to roll along the engaging surface of the rack, wherein the scan unit is slidably disposed on the rack through the gear to slide between one end of the body to an opposing end of the body.

Based on the above mentioned description, the present invention provides the rack with specific size range for giving the scan unit better performance in sliding smoothly along the rack. Moreover, the rack a integrally formed further includes the locking portion to mechanically lock the scan unit at the home position after a scan task is completed. Therefore, no additional locking mechanism is needed to be installed in the scan module. Therefore, the present invention not only improves the scan quality of the scan module, the amount and types of components of the scan module can also be simplified, the assembly time and the production cost thus can be effectively saved.

In order to make the aforementioned and other objectives, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
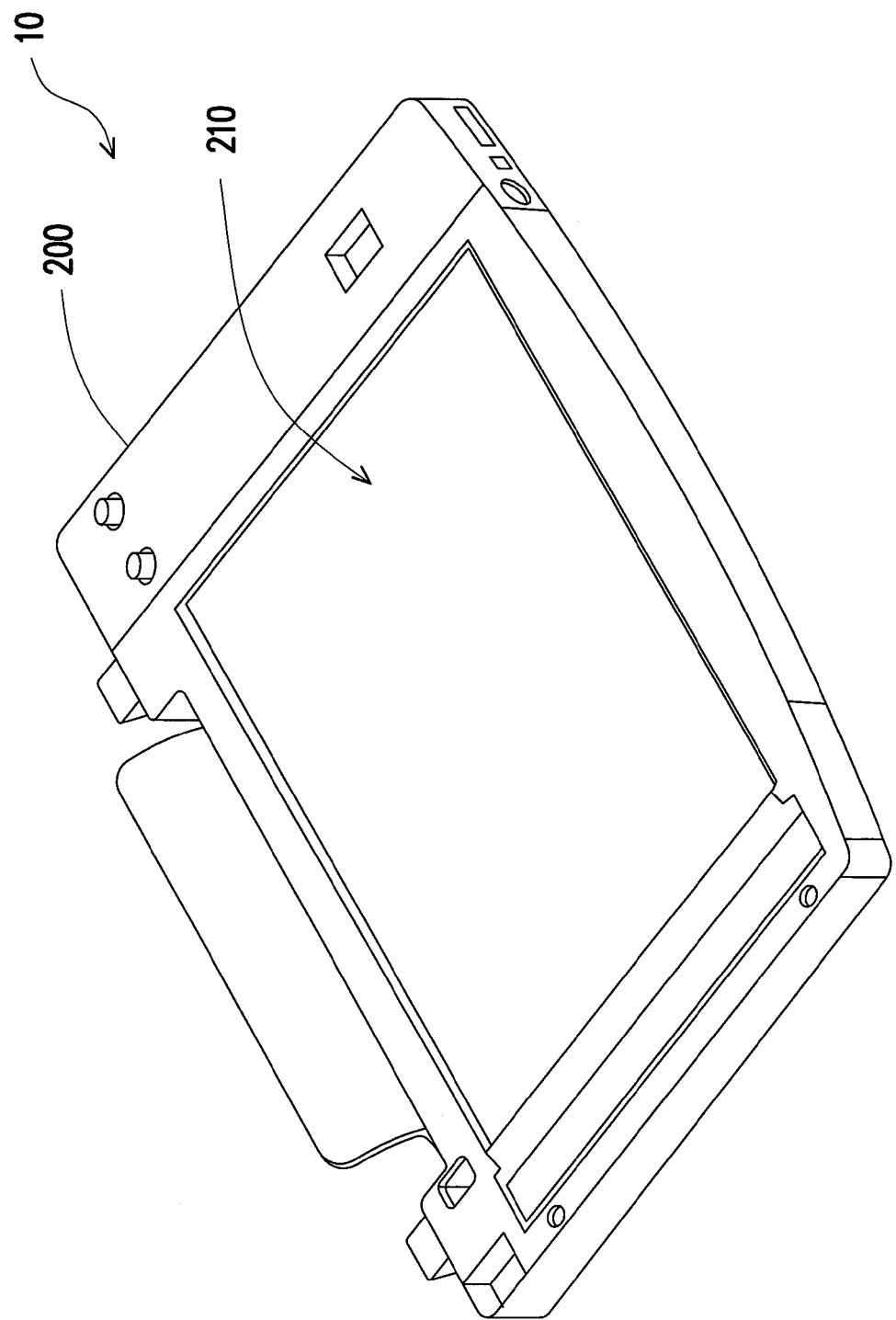
FIG. 1 is a schematic view of a scan module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
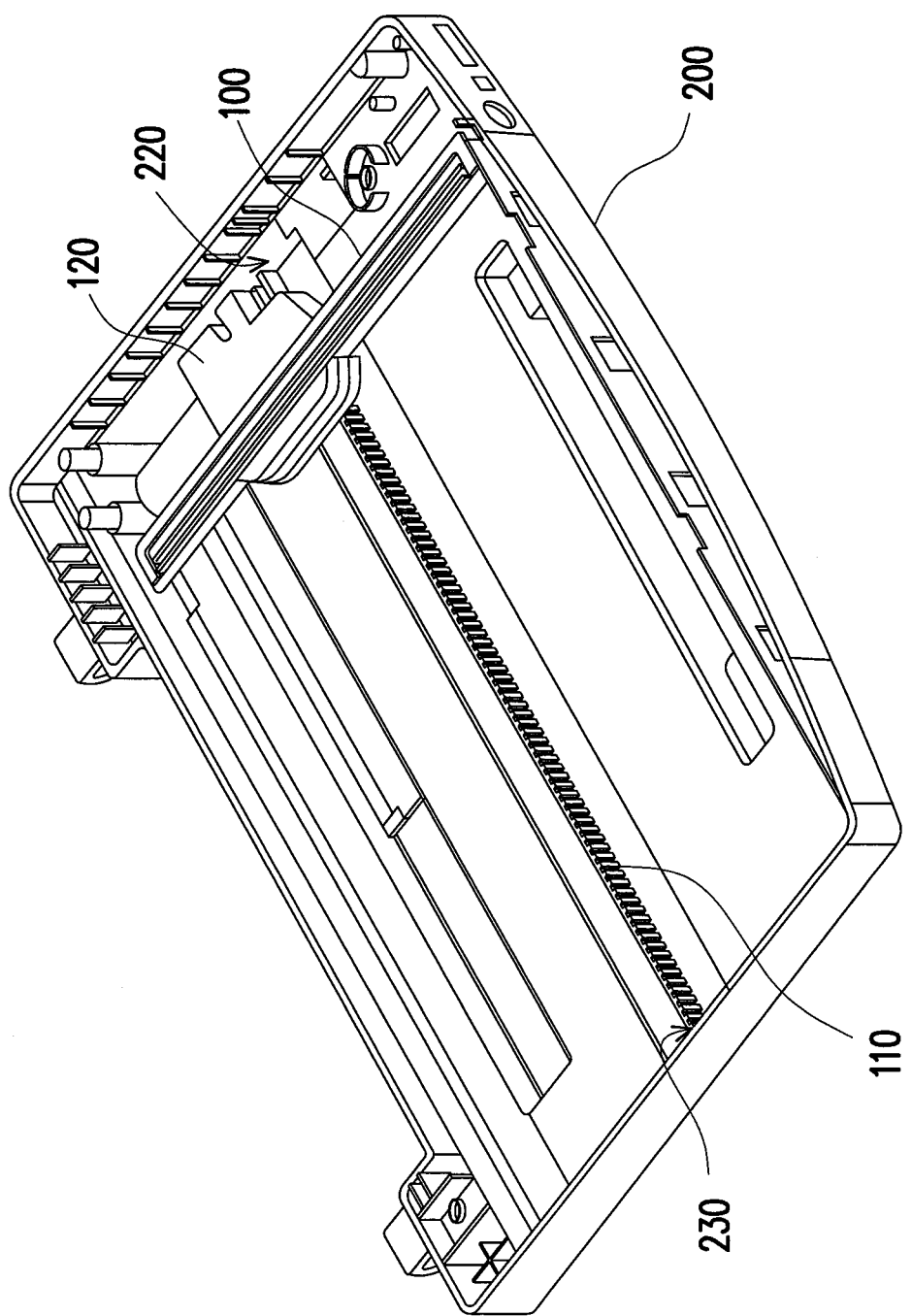
FIG. 2 is a schematic view of the scan module without the carrying surface of FIG. 1.

FIG. 1 is a schematic view of a scan module according to an embodiment of the invention. FIG. 2 is a schematic view of the scan module without the carrying surface of FIG. 1. Referring to FIG. 1 and FIG. 2, in the present embodiment, the scan module 10 comprises a scan mechanism 100 and a body 200. The body 200 has a carrying surface 210 for a paper to be disposed thereon. The scan mechanism 100 is disposed in the body 200 and is disposed under the carrying surface 210. In FIG. 2, the carrying surface is illustrated perspectively for clearer illustration of the components disposed underneath the carrying surface. The scan mechanism 100 includes a rack 110 and a scan unit 120. The scan unit 120 is slidably disposed on the rack 110 such that the scan unit 120 is adapted to slide along the rack 110 and move between one end 220 of the body 200 to an opposing end 230 of the body 200 for performing a scanning process to the paper disposed on the carrying surface 210. It is noted that the scan mechanism 100 is applied in a scan module 10, but the invention is not limited thereto. In other embodiments of the scan mechanism 100 can also be applied in a photocopy machine or the like.

Figure 3:
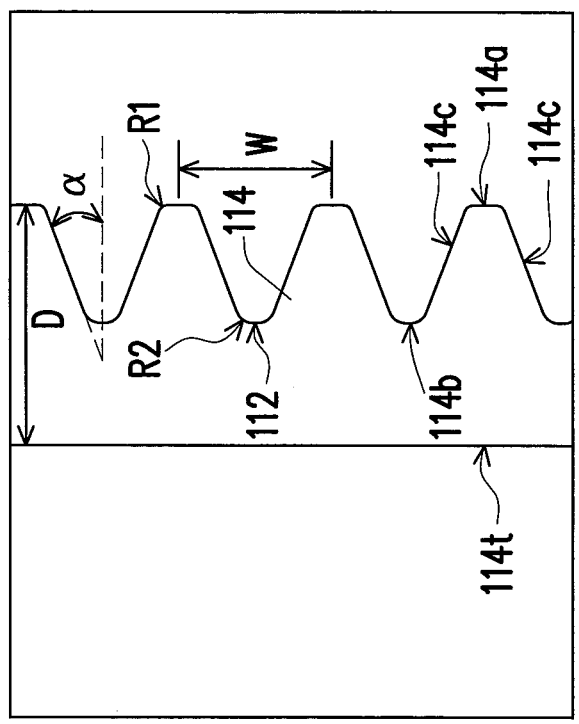
FIG. 3 is a cross-sectional view of the rack of FIG. 2.

FIG. 3 is a cross-sectional view of the rack of FIG. 2. Referring to FIG. 3, in the present embodiment, the rack 110 has an engaging surface 112, a plurality of teeth 114 disposed on the engaging surface 112 and a bottom surface 114*t*. Each of the teeth 114 comprises a top end 114*a* and a bottom end 114*b*. As shown in FIG. 3, the ratio of the distance W between the centers of any two adjacent top ends 114*a*, and the shortest distance D from the top end 114*a* of each tooth to the bottom surface 114*t* of the rack 110 is from 0.56 to 0.79, in other words, W/D is from 0.56 to 0.79. In the present embodiment, the distance W between the centers of any two adjacent top ends 114*a* is from 2.16 mm to 2.56 mm, and the shortest distance D from the top end 114*a* to the bottom surface 114*t* is from 3.25 mm to 3.85 mm. In addition, each of the teeth 114 has two incline surfaces 114*c* connecting the top end 114*a* and the bottom end 114*b*. An included angle α from each incline surface 114*c* to a center line of each of the teeth 114, as shown in FIG. 3, is from 17 degree to 27 degree. Moreover, the top end 114*a* has a plurality of first rounding corners R1, and the bottom end 114*b* has a plurality of second rounding corners R2. A radius of curvature of each first rounding corner R1 is from 0 mm to 0.2 mm, and a radius of curvature of each second rounding corner R2 is from 0 mm to 0.375 mm.

Figure 4:
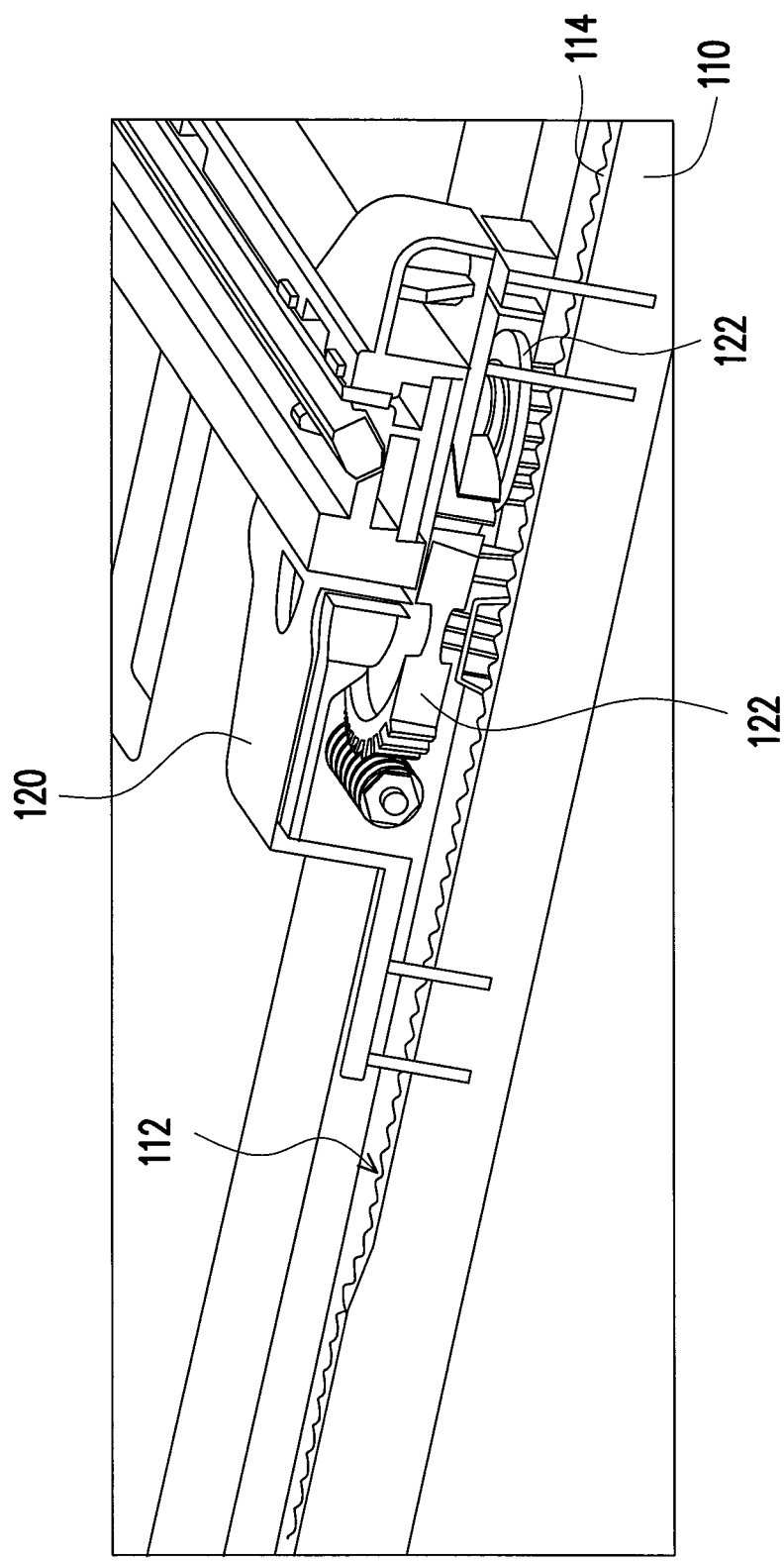
FIG. 4 is a cross-sectional view of the scan unit at the normal portion of the rack.
Figure 5:
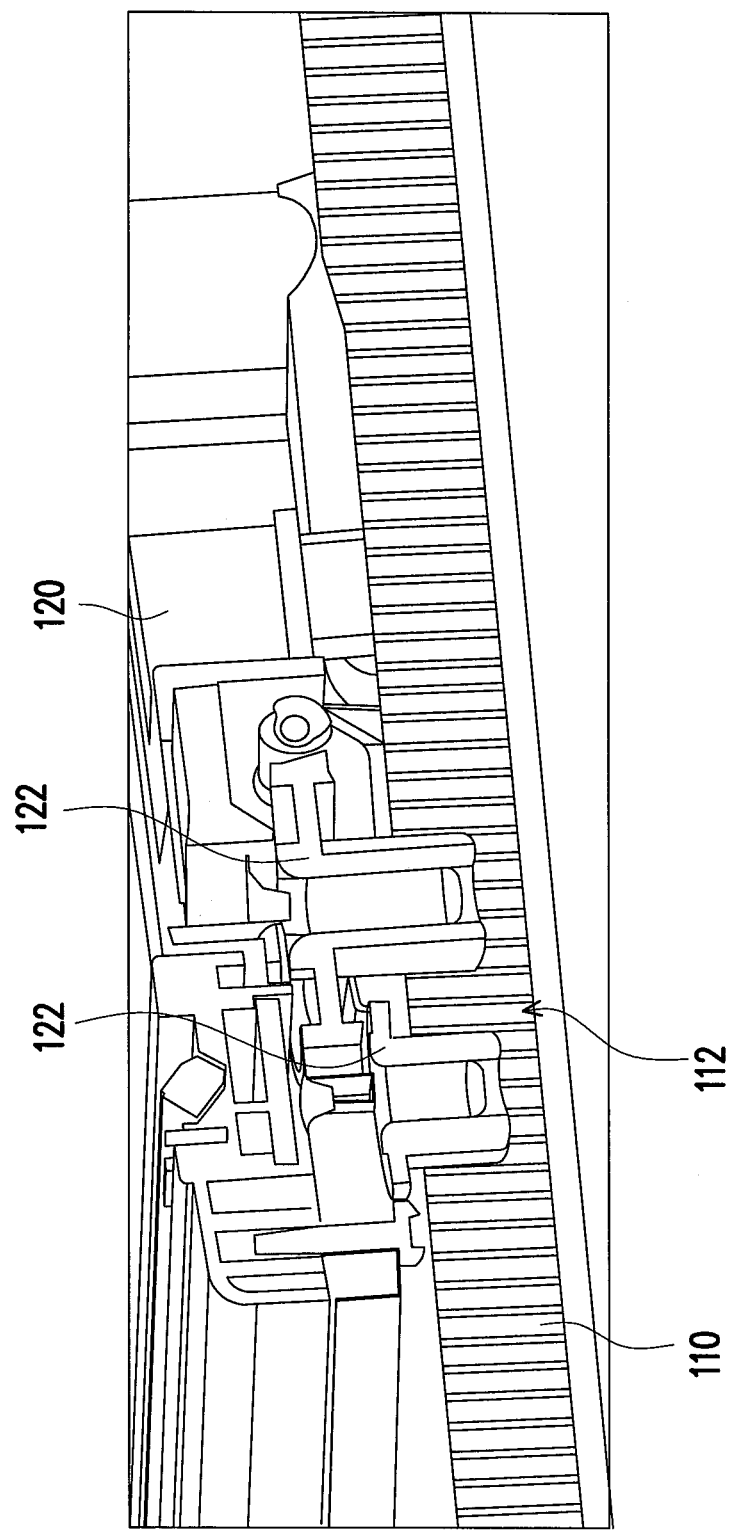
FIG. 5 is another cross-sectional view of the scan unit at the normal portion of the rack.

FIG. 4 is a cross-sectional view of the scan unit at the normal portion of the rack. FIG. 5 is another cross-sectional view of the scan unit at the normal portion of the rack. Referring to FIG. 4 and FIG. 5 at the same time, the scan unit 120 includes at least a gear 122 (two are illustrated herein) engaged with the teeth 114 of the rack 110. The gears 122 are adapted to roll along the engaging surface 112 of the rack 110, such that the scan unit 120 is slidably disposed on the rack 110 through the gear 122 for sliding along the rack 110.

With the disposition described above, the designate sizes of the rack 110 have been proved by the experiments for giving the scan unit 120 better performance in sliding smoothly along the rack 110. Therefore, the scan process can be performed smoothly and the scan quality of the scan module 10 using the above mentioned scan mechanism 100 can be effectively improved.

In the present embodiment, the scan module 10 further comprises a motor (not illustrated) coupled to the scan unit 120 to drive the scan unit 120 to move along the rack 110. In general, every time a scan task is completed, the scan unit 120 must return to a home position. When the scan task is done, the motor drives the scan unit 120 to move and when reaching the home position, the motor stops operating. The scan unit 120 thus stops at the home position, and waits for the next scan task to start.

Figure 6:
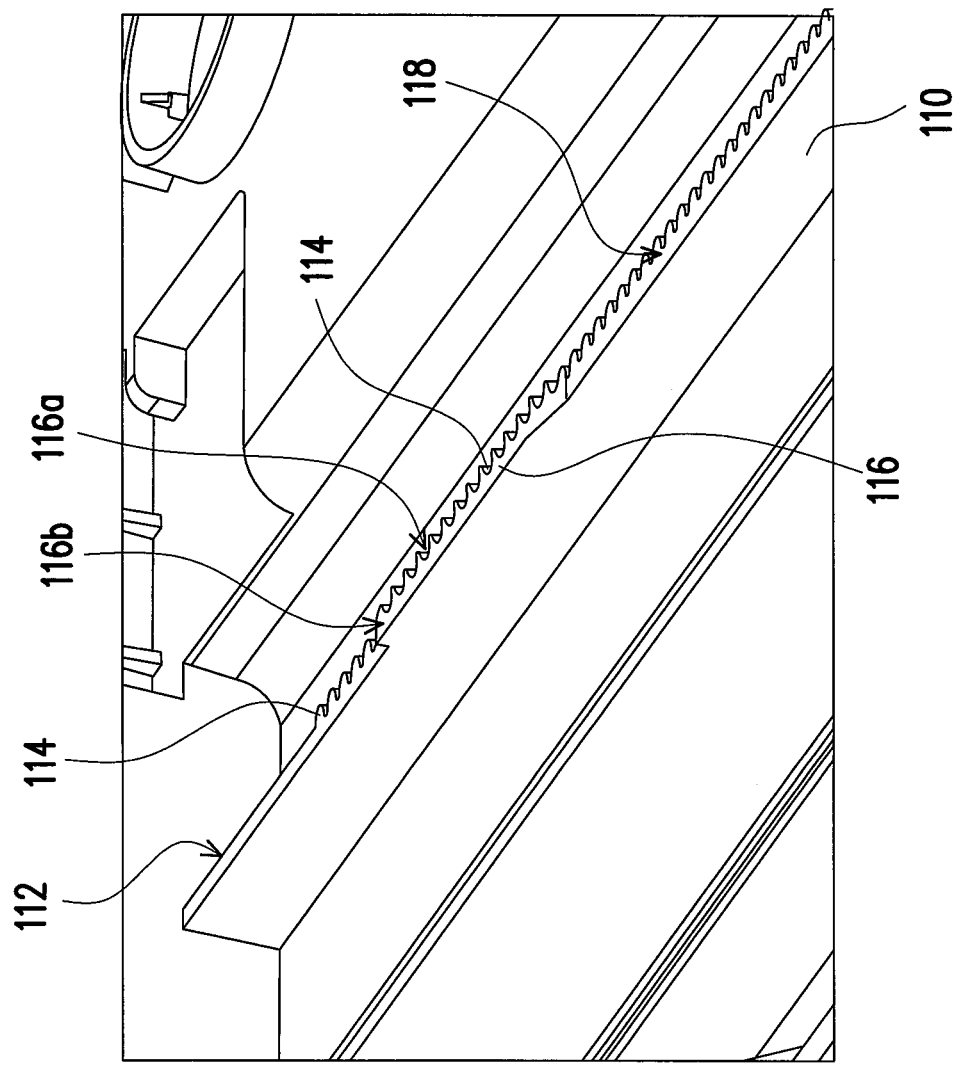
FIG. 6 is a partial view of the rack according to an embodiment of the invention.
Figure 7:
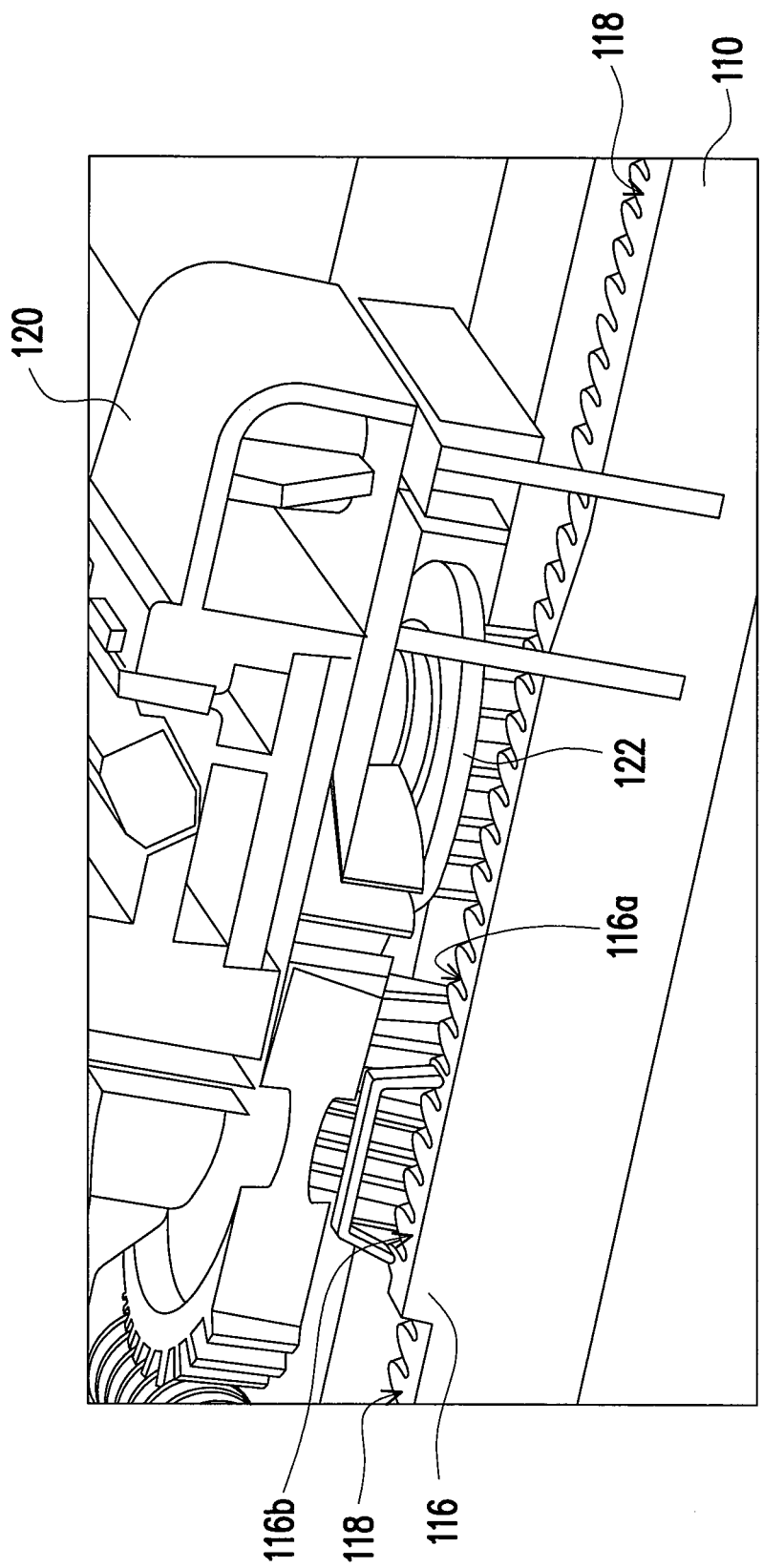
FIG. 7 is a cross-sectional view of the scan unit at the locking portion of the rack.
Figure 8:
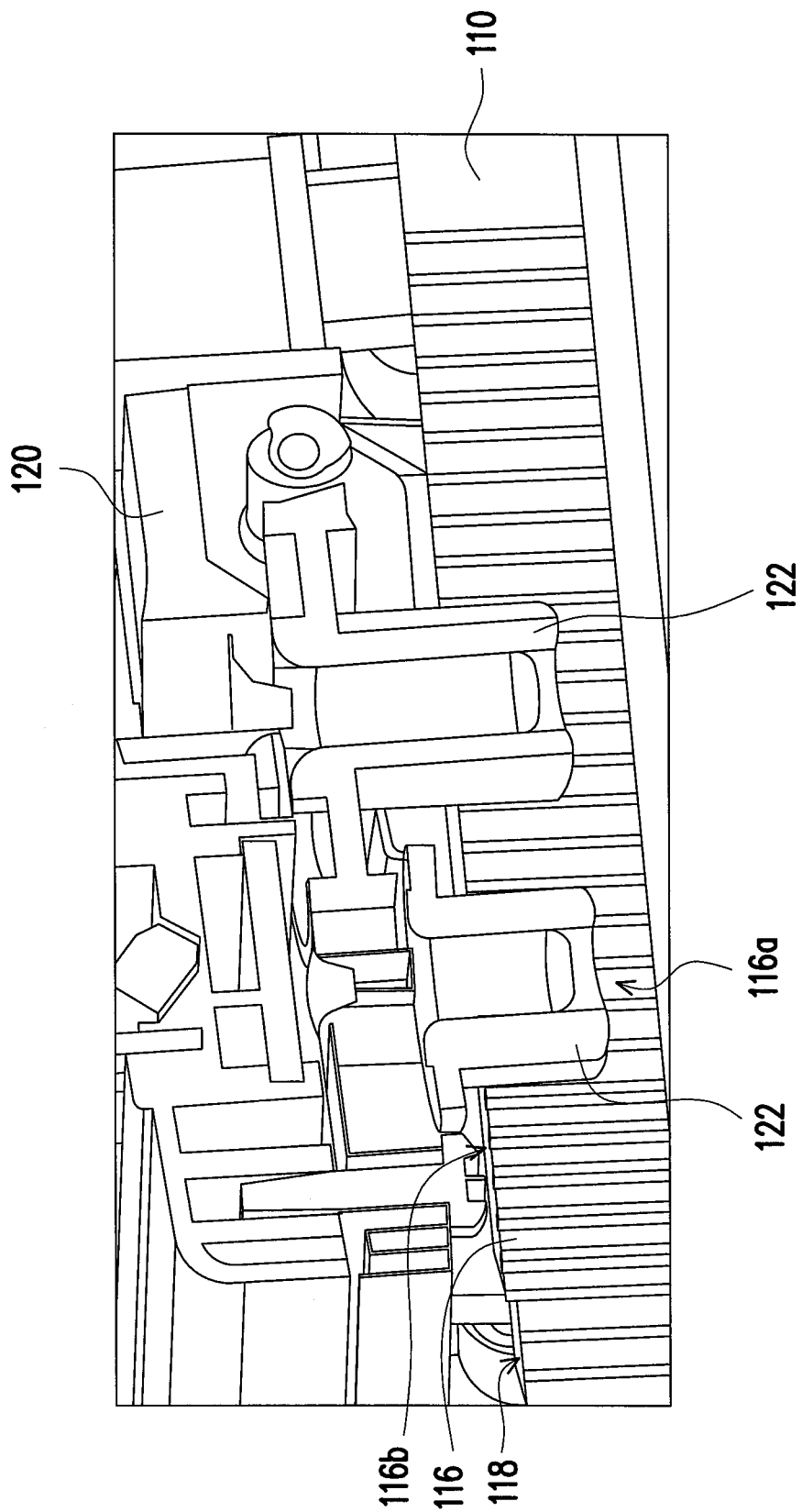
FIG. 8 is another cross-sectional view of the scan unit at the locking portion of the rack.

FIG. 6 is a partial view of the rack according to an embodiment of the invention. FIG. 7 is a cross-sectional view of the scan unit at the locking portion of the rack. FIG. 8 is another cross-sectional view of the scan unit at the locking portion of the rack. Referring to FIG. 6, FIG. 7 and FIG. 8, in the present embodiment, in order to lock the scan unit 120 at the home position after a scan task is completed, the rack 110 further includes a locking portion 116 located at the home position of the rack 110. The locking portion 116 has a first locking surface 116*a* with part of the teeth 114 disposed thereon, and the first locking surface 116*a* protrudes from the engaging surface 112 to stop the gears 122 of the scan unit 120 from rolling over the locking portion 116. In other words, the first locking surface 116*a* of the locking portion 116 is similar to the engaging surface 112 of the rest of the rack 110 with teeth 114 disposed thereon, except that the first locking surface 116*a* protrudes from the engaging surface 112 so when the gears 122 roll to the locking portion 116 (i.e., the home position), the motor stops operating and the first locking surface 116*a* protruding from the engaging surface 112 stops the gear 122 from rolling over the locking portion 116.

Moreover, the rack 110 further includes a supporting surface 118. When the gear 122 moving along the rack 110 among normal positions (i.e., the positions other than the home position), the scan unit 120 leans against the supporting surface 118 and sliding relative to the supporting surface 118. The locking portion 116 further includes a second locking surface 116*b* protruding from the supporting surface 118 to stop the scan unit 120 from sliding over the locking portion 116. In other words, the second locking surface 116*b* of the locking portion 116 is similar to the supporting surface 118 of the rest of the rack 110, except that the second locking surface 116*b* protrudes from the supporting surface 118 so when scan unit 120 slides to the locking portion 116 (i.e., the home position), the motor stops operating and the second locking surface 116*b* protruding from the supporting surface 118 stops the scan unit 120 from sliding over the locking portion 116. When the next scan task starts, the motor starts operating and drives the scan unit 120 to move pass the locking portion 116. In the present embodiment, the rack 110 is integrally formed.

With the design described above, the present embodiment adopts the rack 110 with the locking portion 116 integrally formed thereon to mechanically lock the scan unit 120 at the home position after a scan task is completed. Therefore, no additional locking mechanism is needed to be installed in the scan module 10. The assembly time and the production cost thus can be effectively saved.

In summary, the present invention provides the rack with specific size range for giving the scan unit better performance in sliding smoothly along the rack. Moreover, the rack which is integrally formed further includes the locking portion to mechanically lock the scan unit at the home position after a scan task is completed. Therefore, no additional locking mechanism is needed to be installed in the scan module. Therefore, the present invention not only improves the scan quality of the scan module, the amount and types of components of the scan module can also be simplified, the assembly time and the production cost thus can be effectively saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scan mechanism, configured to be used in a scan module, comprising:
   a rack, having a locking portion, an engaging surface, a bottom surface and a plurality of teeth disposed on the engaging surface, each of the teeth comprises a top end and a bottom end, the distance between the centers of any two adjacent top ends represented as W, the shortest distance from the top end of each tooth to the bottom surface of the rack represented as D, and W/D ranging from 0.56 to 0.79, the locking portion having a first locking surface with part of the teeth disposed thereon; and
   a scan unit, comprising a gear engaged with the teeth of the rack and configured to roll along the engaging surface of the rack, the first locking surface protruding from the engaging surface to stop the gear from rolling over the locking portion, the scan unit is slidably disposed on the rack through the gear.

2. The scan mechanism as claimed in claim 1, wherein W is from 2.16 mm to 2.56 mm.

3. The scan mechanism as claimed in claim 1, wherein D is from 3.25 mm to 3.85 mm.

4. The scan mechanism as claimed in claim 1, wherein each of the teeth has two incline surfaces connecting the top end and the bottom end, an included angle from each incline surface to a center line of each of the teeth is from 17 degree to 27 degree.

5. The scan mechanism as claimed in claim 1, wherein the top end has a plurality of first rounding corners, a radius of curvature of each first rounding corner is from 0 mm to 0.2 mm.

6. The scan mechanism as claimed in claim 1, wherein the bottom end has a plurality of second rounding corners, a radius of curvature of each second rounding corner is from 0 mm to 0.375 mm.

7. The scan mechanism as claimed in claim 1, wherein the rack has a supporting surface, the scan unit leaning against the supporting surface and sliding relative to the supporting surface, the locking portion having a second locking surface protruding from the supporting surface to stop the scan unit from sliding over the locking portion.

8. The scan mechanism as claimed in claim 1, wherein the rack is integrally formed.

9. A scan module, comprising:
   a body, having a carrying surface for a paper to be disposed thereon; and
   a scan mechanism, disposed in the body and under the carrying surface, comprising:
      a rack, having a locking portion, an engaging surface, a bottom surface and a plurality of teeth disposed on the engaging surface, each of the teeth comprises a top end and a bottom end, the distance between the centers of any two adjacent top ends represented as W, the shortest distance from the top end of each tooth to the bottom surface of the rack represented as D, and W/D ranging from 0.56 to 0.79, the locking portion having a first locking surface with part of the teeth disposed thereon; and
   a scan unit, comprising a gear engaged with the teeth of the rack and configured to roll along the engaging surface of the rack, the first locking surface protruding from the engaging surface to stop the gear from rolling over the locking portion, the scan unit is slidably disposed on the rack through the gear to slide between one end of the body to an opposing end of the body.

10. The scan module as claimed in claim 9, wherein W is from 2.16 mm to 2.56 mm.

11. The scan module as claimed in claim 9, wherein D is from 3.25 mm to 3.85 mm.

12. The scan module as claimed in claim 9, wherein each of the teeth has two incline surfaces connecting the top end and the bottom end, an included angle from each incline surface to a center line of each of the teeth is from 17 degree to 27 degree.

13. The scan module as claimed in claim 9, wherein the top end has a plurality of first rounding corners, a radius of curvature of each first rounding corner is from 0 mm to 0.2 mm.

14. The scan module as claimed in claim 9, wherein the bottom end has a plurality of second rounding corners, a radius of curvature of each second rounding corner is from 0 mm to 0.375 mm.

15. The scan module as claimed in claim 9, wherein the rack has a supporting surface, the scan unit leaning against the supporting surface and sliding relative to the supporting surface, the locking portion having a second locking surface protruding from the supporting surface to stop the scan unit from sliding over the locking portion.

16. The scan module as claimed in claim 9, wherein the rack is integrally formed.

17. The scan module as claimed in claim 9, further comprises a motor coupled to the scan unit to drive the scan unit to move, the motor is adapted configured to drive the scan unit to move pass the locking portion.

* * * * *